United States Patent Office 3,060,145
Patented Oct. 23, 1962

3,060,145
PRECIPITATION OF ATACTIC OLEFIN POLYMER
IN THE PRESENCE OF CARBON BLACK
Arthur D. Moscrip, Swarthmore, Pa., assignor to Sun Oil Company, Philadelphia, Pa., a corporation of New Jersey
No Drawing. Filed July 1, 1959, Ser. No. 824,208
3 Claims. (Cl. 260—41)

This invention relates to a method for recovering amorphous polyolefins from solution in a hydrocarbon solvent, and more particularly to a process for recovering the polymer in an easily filterable form.

It is known that alpha olefins such as ethylene, propylene or butene-1 may be polymerized to high molecular weight solid, crystalline polymers in the presence of a titanium halide-aluminum alkyl catalyst, and in the presence of an inert hydrocarbon solvent, at temperatures in the vicinity of 150° F. to 180° F., or higher. The crystalline polymer so produced is insoluble in the solvent, at room temperature or thereabouts, and may be recovered therefrom by filtration. The reaction, however, always produces as a by-product a quantity of amorphous polymer, commonly called atactic polymer, which is soluble in the hydrocarbon solvent, and which must be removed before the solvent can be recycled to the polymerization reaction. Distillation of the solvent from the polymer is impractical, since as distillation proceeds, the solution becomes very viscous, and excessive foaming occurs. It has therefore been the practice to add an anti-solvent, such as an alcohol or ketone of from 1 to 3 carbon atoms, to the solution in order to precipitate the polymer. The polymer initially precipitates as an unfilterable gel, and the gel must be aged to attain an equilibrium between the solvent and the gel. This is time-consuming, and even after equilibrium has been attained, the precipitate is still soft and sticky, and can be filtered only with great difficulty.

It is also known that two or more alpha olefins, such as ethylene, propylene, or butene-1, may be copolymerized in the presence of aluminum alkyl-activated catalysts such as vanadium oxychloride, vanadium tetrachloride and trichloride, or the titanium chlorides, to yield very high molecular weight amorphous atactic copolymers similar to unvulcanized rubber in appearance. These copolymers are soluble in the hydrocarbon solvent used as the reaction medium, and present the same separation problem as do the atactic homopolymers.

It is an object of this invention to provide a method for the separation of atactic polymer from solution in a hydrocarbon solvent in a form which is easy to filter and dry.

I have found that the foregoing object may be attained by adding from about ten to about 100 parts or more by weight, based on the polymer of carbon black, either to the polymer solution, or to the antisolvent prior to mixing the antisolvent with the polymer solution, and then mixing the antisolvent with the solution under conditions of agitation. By proceeding in this manner the polymer is precipitated as a slurry in the hydrocarbon solvent, rather than as a gel. The slurry can be stirred without trouble, is easily filtered, and the resultant polymer particles are easy to dry. In the event that the polymer to be precipitated is an atactic homopolymer, which is at present a waste product, it is preferred to use only about ten parts of carbon black per hundred parts of polymer, since the use of more than this amount is not necessary, and adds to the processing costs. However, when the polymer to be precipitated is a copolymer which is to be cross-linked to form a valuable elastomer, and carbon black is to be used as a reinforcing agent therein, I prefer to add, in the precipitation step, all of the carbon black which will appear in the final product, since precipitation of the polymer in the presence of carbon black results in a very even dispersion of the black in the polymer. In such cases it is preferred to precipitate the polymer in the presence of from about 25 parts to about 100 parts by weight or more of carbon black to 100 parts of the polymer.

In order that those skilled in the art may more fully appreciate my invention and the method of carrying it out, the following examples are given.

Propylene was polymerized at 160° F. in the presence of a titanium trichloride-aluminum triethyl catalyst, and in the presence of isooctane for a period of time sufficient to form a slurry of about 15% by volume of solid polymer in the isooctane. The reaction was then terminated by the addition of 12 weight percent of methanol. This amount of methanol is sufficient to destroy the activity of the catalyst, but insufficient to precipitate the hydrocarbon-soluble polymer. The methanol was removed by decantation, and the isooctane-polymer slurry was filtered to recover solid polypropylene, and to recover a filtrate containing about 2 percent of amorphous polypropylene in solution in isooctane, which solution was concentrated to about 10% polymer content by steam distillation of a portion of the isooctane in the presence of a surfactant.

Example I

One hundred grams of the solution, containing 10 grams of soluble polymer was then added, with stirring, to 400 cc. of acetone containing ten grams of carbon black. The acetone precipitated the hydrocarbon-soluble polymer as a slurry which can easily be filtered and dried.

Example II

A second hundred grams of the solution was slurried with 10 grams of carbon black, and the slurry was introduced, with stirring, into 400 cc. of acetone. Again, the polymer precipitated as an easily filterable slurry.

Example III

The procedure of Example II was repeated, except that only one gram of carbon black was incorporated into the slurry. Even at this low concentration of carbon black the precipitate was easily filterable.

Example IV

If the foregoing procedure is repeated, without the use of carbon black, the polymer is initially precipitated as a soft and sticky gel consisting of particles which coalesce within a short time to form a single mass. In order to separate the polymer from the solvent and antisolvent, it is necessary to age the gel and then comminute it. It can then be filtered, but only with difficulty, and the solid remaining on the filter still contains a large amount of liquid which is difficult to drive off to obtain a dry polymer.

A copolymerization of ethylene and propylene was carried out in isooctane at 77° F. in the presence of a vanadium oxychloride-aluminum triethyl catalyst under a pressure such that the isooctane contained 30% dissolved olefins. The vanadium oxychloride was present in an amount of 0.026 gram per 100 cc. of the reaction mixture, and the Al/V ratio was 3. In starting up the reactor was initially pressured with a mixture of 90% propylene and 10% ethylene, and as the reaction proceeded make-up olefins consisting of a fifty-fifty mixture of ethylene and propylene was added to the reactor. The reaction was terminated when the reaction mixture contained about 10% polymer, all of which was soluble in the isooctane.

Example V

One hundred grams of the solution of co-polymer, containing ten grams of co-polymer, was added with stirring to 400 cc. of acetone containing ten grams of carbon black. The resultant precipitate was of the same physical character as the homopolymer precipitate of the previous examples, and could be readily filtered and dried. If no carbon black is used in the precipitation, the precipitate is gelatinous and is very difficult to filter and dry.

The dried precipitate, which consists of equal weights of carbon black and copolymer, may be milled with 7% by weight of dicumyl peroxide and 7% by weight of tetramethyl thiuram disulfide, based on the weight of the copolymer, and cured at 325° F. for five minutes to yield an elastomer having a tensile strength of 2250 p.s.i., a 300% modulus of 1900 p.s.i., and an elongation of 385%.

While in the foregoing examples acetone alone was used as an anti-solvent, methanol, ethanol, or isopropanol alone may also be used, but somewhat larger volumes are necessary to insure complete precipitation. In addition, the heat of vaporization is lower than that of the alcohols, so that it is more economical to recover. In the examples a volume ratio of antisolvent to solution of about 3:1 was used in order to minimize the quantity of isooctane left in the filter cake, and to thus facilitate drying. Smaller ratios may be used, however, down to 0.6:1, and the resultant precipitate will still be easily filterable. At these low ratios, however, the liquid adhering to the filter cake will be largely isooctane, and the cake will be more difficult to dry. Higher ratios than 3:1 may be used, but the expense of recovering the additional solvent from isooctane does not economically justify the slight reduction in isooctane in the filter cake obtained by the use of the higher ratios.

Similar results are had in the precipitation of amorphous polyethylene or polybutene-1, if at least 10% by weight of carbon black, based on the weight of the polymer, is added to the polymer solution either before, or simultaneously with, the anti-solvent.

Carbon black would appear to be unique in its ability to cause precipitation of amorphous polymer in an easily filterable form. I have tried other finely-divided materials, such as powdered silica and bentonite clay, and found that no improvement in the condition of the precipitate could be had by the addition of these materials.

The invention claimed is:

1. A process for the precipitation of amorphous polyolefins from hydrocarbon solution which comprises treating a solution of a material selected from the group consisting of amorphous olefin homopolymers and copolymers in a hydrocarbon solvent with an antisolvent for the polymer in an amount sufficient to precipitate substantially all of the amorphous polyolefin from the solution in the presence of at least 10% by weight, based on the weight of the polyolefin, of carbon black, said antisolvent being selected from the group consisting of alcohols and ketones, and mixtures thereof.

2. The process according to claim 1 in which the polyolefin is amorphous polypropylene.

3. The process according to claim 1 in which the polyolefin is a copolymer of ethylene and propylene.

References Cited in the file of this patent

UNITED STATES PATENTS

| | | |
|---|---|---|
| 2,710,854 | Seelig | June 14, 1955 |
| 2,843,577 | Friedlander et al. | July 15, 1958 |
| 2,940,960 | Tegge | June 14, 1960 |
| 2,008,949 | Langer et al. | Nov. 14, 1961 |